March 14, 1961    M. HUMENIK, JR., ET AL    2,974,404
HEAT EXCHANGER MATRIX
Filed April 2, 1956

M. HUMENIK, JR.
N. PARIKH
*INVENTOR.*

BY *E.C. McRae*
*J.C. Faulkner*
*T.H. Oster*
*R.T. Seeger*

ATTORNEYS

United States Patent Office 2,974,404
Patented Mar. 14, 1961

2,974,404

HEAT EXCHANGER MATRIX

Michael Humenik, Jr., Inkster, and Niranjan M. Parikh, Ann Arbor, Mich., assignors to Ford Motor Company, Dearborn, Mich., a corporation of Delaware Filed Apr. 2, 1956, Ser. No. 575,666

8 Claims. (Cl. 29—157.3)

This invention relates to the heat exchange art and more specifically to a regenerative heater specifically designed to recover heat from the exhaust stream of a gas turbine and transfer the heat so salvaged into an incoming air stream.

The development of mobile gas turbine units has been retarded severely by the lack of a light weight, efficient and economical means for transferring heat from the exhaust stream to the air leaving the compressor and flowing to the combustor. Such a heat exchange apparatus in addition to the qualities recited above must be comparatively gas tight to a pressure differential as high as 6 atmospheres. Conventionally these heat exchangers have taken the form of a metallic matrix designed so that a portion of such matrix is first heated by the exhaust stream and is then moved into the incoming air stream to which it imparts its specific heat.

Figure 1:
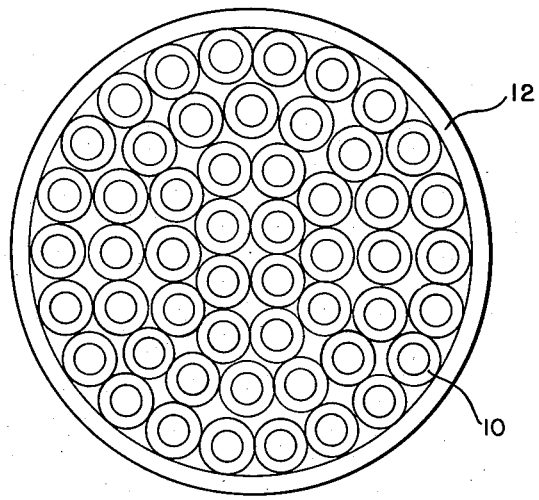
Figure 2:
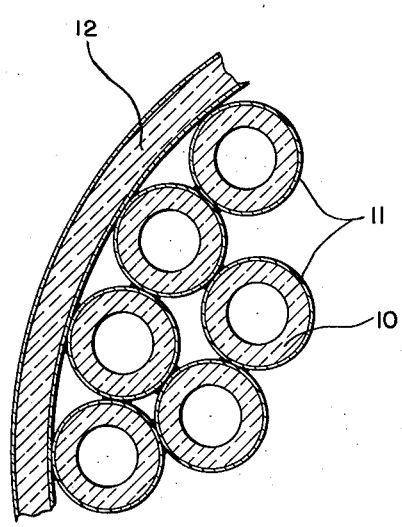

The invention is designed as an improvement upon this type of metallic heat exchanger and is best understood by a study of the figures of the drawings, in which, Figure 1 is a cross section of a ceramic element heat exchanger mechanism in which the elements are shown approximately full size, and Figure 2 is a smaller cross-section of a portion of the exchanger enlarged to show the elements of its construction.

In Figures 1 and 2 the working portion of the heat exchanger comprises a large number of parallel adjacent ceramic tubes 10 coated with a very thin layer of metal 11 and contained within a retaining tube 12, preferably, although not necessarily of the same material employed in fabricating tubes 10.

In the fabrication of this type of regenerative heat exchanger, a large number of ceramic tubes 10 are assembled tightly within a retaining tube 12. The entire assemblage is first made chemically clean and then dipped into a liquid containing a metal such as gold, silver or copper. This assemblage is then fired at a temperature sufficiently high to cause the metal to produce a uniform coating over the tubes and an ionic exchange to take place between the surface of the glass and the metal. This binds the entire assemblage firmly and rigidly into one unit.

The preferred material of construction for this type of heat exchanger is a heat resistant boro-silicate glass known commonly as Pyrex. However any ceramic material suitable for the temperature ranges contemplated may be used. As a metalliferous coating material it is preferred to use a solution of silver nitrate in water. However any solution of metal salt or a suspension of metallic particles may be employed without departing from the scope of the invention.

As a typical structure, a 3½ inch Pyrex form was filled with Pyrex tubes 1 millimeter in bore diameter and with a wall thickness of .25 millimeter. After thorough cleaning this assemblage was immersed in silver nitrate solution and the excess drained off. The concentration of silver nitrate is not critical. Good results have been obtained with solutions from 1 to 8% silver nitrate. The entire matrix was then fired at 1100 degrees Fahrenheit for two hours and allowed to cool. As those familiar with the art are well aware, sintering phenomena of this nature may be expedited by raising the temperature or lower temperatures and longer times of sintering may be used.

It is not necessary that the metal carrying liquid in which assemblage is dipped be a true solution of a metal salt. Any suitable suspension of a pulverulent metal may be used.

We claim as our invention:

1. The process of fabricating a thermal regenerative apparatus comprising assembling a plurality of chemically clean, ceramic, cylindrical tubes within a retaining member, thoroughly wetting the assemblage with a liquid containing a metal selected from the group consisting of gold, silver, and copper, and sintering the assemblage at a temperature below the softening point of the ceramic but sufficiently high to cause an ionic exchange to occur between the metal and the ceramic surface, to produce a uniform coating of metal on the tubes, and to sinter the tubes together.

2. The process of fabricating a thermal regenerative apparatus comprising assembling a plurality of chemically clean, heat resistant glass tubes within a heat resistant retaining member, thoroughly wetting the assemblage with a liquid containing a metal selected from the group consisting of gold, silver, and copper, and sintering the assemblage at a temperature below the softening point of the heat resistant glass but sufficiently high to cause an ionic exchange to occur between the metal and the ceramic surface, to produce a uniform coating of metal on tubes and to sinter the tubes together.

3. The process of fabricating a thermal regenerative apparatus comprising assembling a plurality of chemically clean, ceramic, cylindrical tubes within a heat resistant restraining member, thoroughly wetting the assemblage with a liquid containing silver and sintering the assemblage at a temperature below the softening point of the ceramic but sufficiently high to cause an ionic exchange to occur between the silver and the ceramic surface, to produce a uniform coating of silver on the tubes, and to sinter the tubes together.

4. The process of fabricating a thermal regenerative apparatus comprising assembling a plurality of chemically clean cylindrical ceramic tubes within a retaining member, thoroughly wetting the assemblage with a solution of a silver salt and sintering the assemblage at a temperature below the softening point of the ceramic but sufficiently high to produce a uniform coating of silver on the tubes, to sinter the ceramic tubes together and to cause an ionic exchange between the ceramic surface and the silver coating.

5. The process of fabricating a thermal regenerative apparatus comprising assembling a plurality of chemically clean cylindrical tubes within a retaining member, thoroughly wetting the assemblage with a solution of silver nitrate and sintering the assemblage at a temperature below the softening point of the ceramic but sufficiently high to produce a uniform coating of metal on the tubes, to sinter the tubes together and to cause an ionic exchange between the tube surface and the silver coating.

6. The process of fabricating a thermal regenerative apparatus comprising assembling a plurality of chemically clean cylindrical tubes of heat resistant glass within a retaining member, thoroughly wetting the assemblage with a solution of silver nitrate, sintering the assemblage at a temperature below the softening point of the glass but sufficiently high to produce a uniform coating of silver on the tubes to sinter the tubes together, and to cause an ionic exchange between the silver and the surface of the glass tubes.

7. The process of fabricating a heat exchange apparatus comprising, assembling a plurality of chemically clean, ceramic tubes within a retaining member, thoroughly coating the assemblage with a metal selected from the group consisting of gold, silver, and copper, and sintering the assemblage at a temperature below the softening point of the ceramic but sufficiently high to cause an ionic exchange to occur between the metal and the ceramic surface to produce a uniform coating on the tubes and to sinter the tubes together.

8. The process of joining a plurality of chemically clean ceramic members comprising, thoroughly coating the members with a metal selected from the group consisting of gold, silver and copper, and sintering the coated members at a temperature below the softening point of the ceramic but sufficiently high to cause an ionic exchange to occur between the metal and the ceramic members.

References Cited in the file of this patent

UNITED STATES PATENTS

| 172,956 | Benton | Feb. 1, 1876 |
| 935,723 | Zimmermann | Oct. 5, 1909 |
| 1,481,348 | Chapman | Jan. 22, 1924 |
| 1,806,738 | Burns et al. | May 26, 1931 |
| 2,130,879 | Dobke | Sept. 28, 1938 |
| 2,139,431 | Vatter | Dec. 6, 1938 |
| 2,379,635 | Hastings | July 3, 1945 |
| 2,395,442 | Ballard | Feb. 26, 1946 |
| 2,433,546 | Cornelius | Dec. 30, 1947 |
| 2,490,776 | Braunsdorff | Dec. 13, 1949 |
| 2,668,923 | Bondley | Feb. 9, 1954 |
| 2,671,746 | Brew | Mar. 9, 1954 |
| 2,709,147 | Ziegler | May 24, 1955 |

OTHER REFERENCES

Metallizing Non-Conductors by Samuel Wein, pp. 24, 25, 34 and 35. Published in 1945 by Metal Industry Publishing Co., 11 West Forty-second St., New York, New York.